US012776514B2

(12) United States Patent
Mizuno et al.

(10) Patent No.: US 12,776,514 B2
(45) Date of Patent: Oct. 27, 2026

(54) SOLID ELECTROLYTE MATERIAL AND BATTERY USING SAME

(71) Applicant: Panasonic Intellectual Property Management Co., Ltd., Osaka (JP)

(72) Inventors: Keita Mizuno, Osaka (JP); Yoshiaki Tanaka, Kyoto (JP); Tetsuya Asano, Nara (JP); Akihiro Sakai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 605 days.

(21) Appl. No.: 18/362,963

(22) Filed: Aug. 1, 2023

(65) Prior Publication Data

US 2023/0387458 A1 Nov. 30, 2023

Related U.S. Application Data

(63) Continuation of application No. PCT/JP2021/043141, filed on Nov. 25, 2021.

(30) Foreign Application Priority Data

Feb. 26, 2021 (JP) ................................ 2021-031017

(51) Int. Cl.
*H01M 10/0562* (2010.01)
*C01F 17/36* (2020.01)
(Continued)

(52) U.S. Cl.
CPC ......... *H01M 10/0562* (2013.01); *C01F 17/36* (2020.01); *H01M 4/62* (2013.01); *H01M 10/0525* (2013.01); *C01P 2002/72* (2013.01); *C01P 2006/40* (2013.01); *H01M 2300/008* (2013.01)

(58) Field of Classification Search
CPC ...................... H01M 10/0562; H01M 10/0525
See application file for complete search history.

(56) References Cited

U.S. PATENT DOCUMENTS

2021/0269320 A1 9/2021 Kubo et al.
2021/0399334 A1* 12/2021 Mo .................. H01M 10/0525
2022/0216507 A1* 7/2022 Sun ......................... C03C 10/16

FOREIGN PATENT DOCUMENTS

CN 111725560 9/2020
JP 2011-129312 6/2011
(Continued)

OTHER PUBLICATIONS

International Search Report of PCT application No. PCT/JP2021/043141 dated Feb. 1, 2022.
(Continued)

*Primary Examiner* — Olatunji A Godo
(74) *Attorney, Agent, or Firm* — WHDA, LLP

(57) ABSTRACT

A solid electrolyte material of the present disclosure contains Li, Yb, and X. X is at least two selected from the group consisting of F, Cl, Br, and I. A battery of the present disclosure includes a positive electrode, a negative electrode, and an electrolyte layer disposed between the positive electrode and the negative electrode. At least one selected from the group consisting of the positive electrode, the negative electrode, and the electrolyte layer contains the solid electrolyte material of the present disclosure.

13 Claims, 4 Drawing Sheets

(51) Int. Cl.
*H01M 4/62* (2006.01)
*H01M 10/0525* (2010.01)

(56) References Cited

FOREIGN PATENT DOCUMENTS

| | | |
|---|---|---|
| WO | 2011/073798 | 6/2011 |
| WO | 2020/136952 A1 | 7/2020 |

OTHER PUBLICATIONS

Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of inorganic and General Chemistry, vol. 623/Issue 7, Jul. 1, 1997, pp. 1067-1073.

Andreas Bohnsack et al., "The bromides Li3MBr6 (M=Sm—Lu, Y): Synthesis, Crystal Structure, and Ionic Mobility", Journal of inorganic and General Chemistry, vol. 623/Issue 9, Sep. 1, 1997, pp. 1352-1356.

* cited by examiner

SOLID ELECTROLYTE MATERIAL AND BATTERY USING SAME

BACKGROUND

1. Technical Field

The present disclosure relates to a solid electrolyte material and a battery using the same.

2. Description of the Related Art

Japanese Unexamined Patent Application Publication No. 2011-129312 discloses an all-solid-state battery using a sulfide solid electrolyte material.

Andreas Bohnsack et al., "Ternary Chlorides of the Rare-Earth Elements with Lithium, $Li_3MCl_6$ (M=Tb—Lu, Y, Sc): Synthesis, Crystal Structures, and Ionic Motion", Journal of Inorganic and General Chemistry, 1997.07, Vol. 623/Issue 7, pp. 1067-1073, and Andreas Bohnsack et al., "The bromides $Li_3MBr_6$ (M=Sm—Lu, Y): Synthesis, Crystal Structure, and Ionic Mobility", Journal of Inorganic and General Chemistry, 1997.09, Vol. 623/Issue 9, pp. 1352-1356 disclose solid electrolyte materials represented by the compositional formulas $Li_3YbCl_6$ and $Li_3YbBr_6$, respectively.

SUMMARY

One non-limiting and exemplary embodiment provides a novel and highly useful solid electrolyte material.

In one general aspect, the techniques disclosed here feature a solid electrolyte material containing Li, Yb, and X, wherein X is at least two selected from the group consisting of F, Cl, Br, and I.

The solid electrolyte material provided according to the present disclosure is novel and highly useful.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Figure 1:
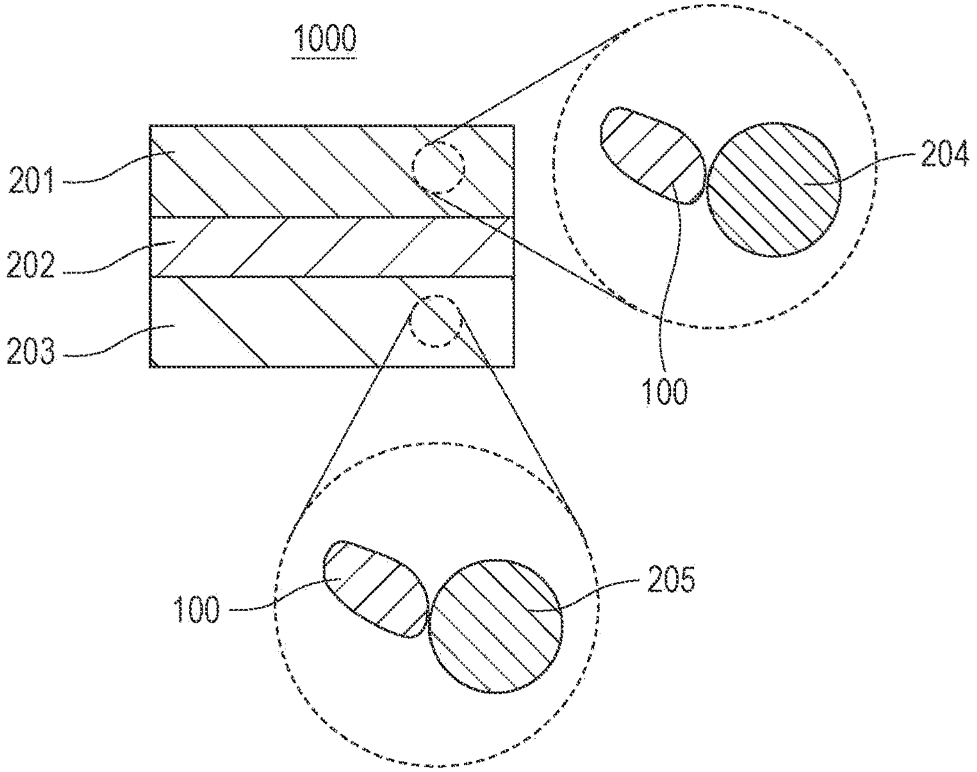
FIG. 1 illustrates a sectional view of a battery 1000 according to a second embodiment.

Hereinbelow, embodiments of the present disclosure will be described with reference to the drawings. The present disclosure is not limited to those embodiments discussed below.

First Embodiment

A solid electrolyte material according to a first embodiment contains Li, Yb, and X. Here, X is at least two selected from the group consisting of F, Cl, Br, and I.

The solid electrolyte material according to the first embodiment is a novel and highly useful solid electrolyte material. For example, the solid electrolyte material according to the first embodiment may have practical lithium ion conductivity and may have, for example high lithium ion conductivity. Here, the high lithium ion conductivity is, for example, greater than or equal to $5.0\times10^{-5}$ S/cm near room temperature (for example, 25° C.). That is, the solid electrolyte material according to the first embodiment may have an ion conductivity of, for example, greater than or equal to $5.0\times10^{-5}$ S/cm.

The solid electrolyte material according to the first embodiment may be used to obtain a battery having excellent charge-discharge characteristics. An example of such batteries is an all-solid-state battery. The all-solid-state battery may be a primary battery or a secondary battery.

The solid electrolyte material according to the first embodiment does not substantially contain sulfur. The phrase that the solid electrolyte material according to the first embodiment does not substantially contain sulfur means that the solid electrolyte material does not contain sulfur as a constituent element, except for sulfur that is incidentally mixed as an impurity. In this case, the amount of sulfur mixed as an impurity in the solid electrolyte material is, for example, less than or equal to 1 mol %. The solid electrolyte material according to the first embodiment does not contain sulfur. The sulfur-free solid electrolyte material does not generate hydrogen sulfide even when exposed to air and is therefore highly safe. The sulfide solid electrolyte disclosed in Japanese Unexamined Patent Application Publication No. 2011-129312 may generate hydrogen sulfide when exposed to air.

The solid electrolyte material according to the first embodiment may contain elements that are incidentally mixed. For example, such elements are hydrogen, oxygen, and nitrogen. Such elements may be present in ingredient powders for the solid electrolyte material or in the atmosphere in which the solid electrolyte material is produced or stored. In the solid electrolyte material according to the first embodiment, the amount of such incidental elements is, for example, less than or equal to 1 mol %.

In order to increase ion conductive properties of the solid electrolyte material, the solid electrolyte material according to the first embodiment may be such that X is at least two selected from the group consisting of Cl, Br, and I.

The solid electrolyte material according to the first embodiment may be a material represented by the following compositional formula (1):

$$Li_{6-3a}Yb_aCl_{6-x-y-z}Br_xI_yF_z \quad (1)$$

Here, the formula satisfies the following five relations:

$0.5\leq a\leq 1.5$, $0<x<6$, $0\leq y\leq 3$, $0\leq z\leq 2$, and $0<x+y+z\leq 6$. The material represented by the compositional formula (1) has high ion conductivity.

In order to increase ion conductive properties of the solid electrolyte material, the compositional formula (1) may satisfy the following five relations:

$0.8\leq a\leq 1.2$, $0<x<6$, $0 \le y \le 2$, $0 \le z \le 1$, and $0 < x+y+z \le 6$.

The upper limit and the lower limit of the range of a in the compositional formula (1) may be defined by a combination of any numbers selected from 0.8, 0.9, 1, 1.1, and 1.2.

In order to increase ion conductive properties of the solid electrolyte material, the compositional formula (1) may satisfy $0.8 \le a \le 1.2$. In order to further increase ion conductive properties of the solid electrolyte material, the compositional formula (1) may satisfy $0.8 \le a \le 1.1$. In order to further increase ion conductive properties of the solid electrolyte material, the compositional formula (1) may satisfy $0.8 \le a \le 1$.

The upper limit and the lower limit of the range of x in the compositional formula (1) may be defined by a combination of any numbers selected from greater than 0 (that is, <x), 0.75, 1, 1.5, 1.7, 1.9, 2, 2.25, 2.5, 3, 4, 5, and less than 6 (that is, x<6).

In order to increase ion conductive properties of the solid electrolyte material, the compositional formula (1) may satisfy the relation: $0 < x \le 4$. In order to further increase ion conductive properties of the solid electrolyte material, the compositional formula (1) may satisfy the relation: $0 < x \le 3$. In order to further increase ion conductive properties of the solid electrolyte material, the compositional formula (1) may satisfy the relation: $1.5 \le x \le 3$.

The upper limit and the lower limit of the range of y in the compositional formula (1) may be defined by a combination of any numbers selected from 0, 0.5, 1, 1.5, and 2.

In order to increase ion conductive properties of the solid electrolyte material, the compositional formula (1) may satisfy the relation: $0 \le y \le 2$. In order to further increase ion conductive properties of the solid electrolyte material, the compositional formula (1) may satisfy the relation: $0 \le y \le 1.5$. In order to further increase ion conductive properties of the solid electrolyte material, the compositional formula (1) may satisfy the relation: $0 \le y \le 1$. In order to further increase ion conductive properties of the solid electrolyte material, the compositional formula (1) may satisfy the relation: $0.5 \le y \le 2$.

The upper limit and the lower limit of the range of z in the compositional formula (1) may be defined by a combination of any numbers selected from 0, 0.1, 0.3, 0.5, and 1.

In order to increase ion conductive properties of the solid electrolyte material, the compositional formula (1) may satisfy the relation: $0 \le z \le 1$.

An X-ray diffraction pattern of the solid electrolyte material according to the first embodiment may be obtained by θ-2θ X-ray diffractometry using Cu-Kα radiation (1.5405 Å and 1.5444 Å wavelengths, that is, 0.15405 nm and 0.15444 nm wavelengths). The X-ray diffraction pattern obtained may have at least two peaks in the range of diffraction angles 2θ of greater than or equal to 26.0° and less than or equal to 35.0°, and at least one peak in the range of diffraction angles 2θ of greater than or equal to 13.0° and less than or equal to 17.0°. A crystal phase having these peaks is called a first crystal phase. Lithium ion diffusion pathways occur easily in the crystal when a solid electrolyte material contains a first crystal phase. Thus, when a first crystal phase is present in the solid electrolyte material according to the first embodiment, the solid electrolyte material according to the first embodiment has high ion conductivity.

The crystal system of the first crystal phase belongs to the monoclinic systems. The term "monoclinic" in the present disclosure means a crystal phase that has a crystal structure similar to $Li_3InCl_6$ disclosed in ICSD (inorganic crystal structure database) Collection Code 89617 and has an X-ray diffraction pattern unique to this structure. In the present disclosure, "having a similar crystal structure" means that the crystals are classified into the same space group and have atomic arrangement structures similar to one another; the phrase does not limit the lattice constants. The relative intensity ratio and the diffraction angles of the diffraction peaks in the X-ray diffraction pattern of the solid electrolyte material according to the first embodiment may differ from the diffraction pattern of $Li_3InCl_6$.

The solid electrolyte material according to the first embodiment may further contain a second crystal phase different from the first crystal phase. That is, the solid electrolyte material according to the first embodiment may further contain a second crystal phase that shows distinct peaks outside the ranges of the diffraction angle 2θ described above. For example, the second crystal phase may be a crystal phase belonging to the trigonal systems or the orthorhombic systems. Here, the term "trigonal" in the present disclosure means a crystal phase that has a crystal structure similar to $Li_3ErCl_6$ disclosed in ICSD Collection Code 50151. The term "orthorhombic" means a crystal phase that has a crystal structure similar to $Li_3YbCl_6$ disclosed in ICSD Collection Code 50152.

The solid electrolyte material according to the first embodiment may be crystalline or amorphous. Furthermore, the solid electrolyte material according to the first embodiment may be a mixture of crystalline and amorphous forms. Here, the term crystalline means that the material gives rise to peaks in an X-ray diffraction pattern. The term amorphous means that the material shows a broad peak (namely, a halo) in an X-ray diffraction pattern. When the material is a mixture of amorphous and crystalline forms, the X-ray diffraction pattern contains peaks and a halo.

The shape of the solid electrolyte material according to the first embodiment is not limited. Examples of the shapes include acicular, spherical, and ellipsoidal. The solid electrolyte material according to the first embodiment may be particles. The solid electrolyte material according to the first embodiment may be formed to have a pellet or plate shape.

When, for example, the solid electrolyte material according to the first embodiment is particles (for example, spherical particles), the solid electrolyte material may have a median diameter of greater than or equal to 0.1 μm and less than or equal to 100 The median diameter means the particle size at 50% cumulative volume in the volume-based grain size distribution. For example, the volume-based grain size distribution is measured with a laser diffraction measurement device or an image analyzer.

The solid electrolyte material according to the first embodiment may have a median diameter of greater than or equal to 0.5 μm and less than or equal to 10 Such a solid electrolyte material according to the first embodiment has higher ion conductive properties. Furthermore, such a median diameter ensures that when the solid electrolyte material according to the first embodiment is mixed with an additional material, such as an active material, a good dispersion condition is achieved between the solid electrolyte material according to the first embodiment and the additional material.

Methods for Producing Solid Electrolyte Materials

For example, the solid electrolyte material according to the first embodiment is produced by the following method.

Two or more halides as ingredient powders are mixed so as to have a desired composition.

When, for example, the desired composition is $Li_3YbBr_{0.75}Cl_{5.25}$, a LiBr ingredient powder, a LiCl ingredient powder, and a $YbCl_3$ ingredient powder (three ingredient halide powders) are mixed so that the molar ratio will be approximately 0.75:2.25:1. The ingredient powders may be mixed in a molar ratio controlled beforehand to compensate for compositional changes expected in the synthesis process.

The mixture of the ingredient powders is heat-treated in an inert gas atmosphere and is reacted to give a reaction product. Examples of the inert gases that may be used include helium, nitrogen, and argon. The heat treatment step may be performed in vacuum. In the heat treatment step, the powder of the mixed materials may be placed in a container (for example, a crucible or a sealed tube) and may be heat-treated in a heating furnace.

Alternatively, the ingredient powders may be reacted with one another mechanochemically (that is, by a mechanochemical milling method) in a mixing device, such as a planetary ball mill, to give a reaction product. The mechanochemically obtained reaction product may be further heat-treated in an inert gas atmosphere or in vacuum.

The solid electrolyte material according to the first embodiment is obtained by the methods described above.

Second Embodiment

The second embodiment of the present disclosure will be described hereinbelow. The description of features described in the first embodiment may be omitted.

The second embodiment describes a battery that uses the solid electrolyte material according to the first embodiment.

The battery according to the second embodiment includes a positive electrode, a negative electrode, and an electrolyte layer. The electrolyte layer is disposed between the positive electrode and the negative electrode. At least one selected from the group consisting of the positive electrode, the electrolyte layer, and the negative electrode contains the solid electrolyte material according to the first embodiment.

The battery according to the second embodiment has excellent charge-discharge characteristics because of its containing the solid electrolyte material according to the first embodiment. The battery may be an all-solid-state battery.

FIG. 1 illustrates a sectional view of a battery 1000 according to the second embodiment.

The battery 1000 according to the second embodiment includes a positive electrode 201, an electrolyte layer 202, and a negative electrode 203. The electrolyte layer 202 is disposed between the positive electrode 201 and the negative electrode 203.

The positive electrode 201 contains positive electrode active material particles 204 and solid electrolyte particles 100.

The electrolyte layer 202 contains an electrolyte material. For example, the electrolyte material is a solid electrolyte material.

The negative electrode 203 contains negative electrode active material particles 205 and solid electrolyte particles 100.

The solid electrolyte particles 100 are particles including the solid electrolyte material according to the first embodiment. The solid electrolyte particles 100 may be particles made of the solid electrolyte material according to the first embodiment or may be particles containing the solid electrolyte material according to the first embodiment as a main component. Here, the phrase that the particles contain the solid electrolyte material according to the first embodiment as a main component means that the solid electrolyte material according to the first embodiment represents the largest molar ratio among the components in the particles.

The solid electrolyte particles 100 may have a median diameter of greater than or equal to 0.1 μm and less than or equal to 100 μm or may have a median diameter of greater than or equal to 0.5 μm and less than or equal to 10 μm. In this case, the solid electrolyte particles 100 have higher ion conductive properties.

The positive electrode 201 contains a material capable of occluding and releasing metal ions (for example, lithium ions). For example, the material is a positive electrode active material (for example, the positive electrode active material particles 204).

Examples of the positive electrode active materials include lithium-containing transition metal oxides, transition metal fluorides, polyanion materials, fluorinated polyanion materials, transition metal sulfides, transition metal oxyfluorides, transition metal oxysulfides, and transition metal oxynitrides. Examples of the lithium-containing transition metal oxides include $Li(Ni, Co, Al)O_2$ and $LiCoO_2$.

In the present disclosure, the notation "(A, B, C)" in a chemical formula means "at least one selected from the group consisting of A, B, and C". For example, "(Ni, Co, Al)" is synonymous with "at least one selected from the group consisting of Ni, Co, and Al".

The positive electrode active material particles 204 may have a median diameter of greater than or equal to 0.1 μm and less than or equal to 100 μm. When the positive electrode active material particles 204 have a median diameter of greater than or equal to μm, the positive electrode active material particles 204 and the solid electrolyte particles 100 may be well dispersed in the positive electrode 201. As a result, charge-discharge characteristics of the battery are enhanced. When the positive electrode active material particles 204 have a median diameter of less than or equal to 100 μm, the lithium diffusion rate in the positive electrode active material particles 204 is enhanced. Consequently, the battery may be operated at a high output.

The positive electrode active material particles 204 may have a median diameter larger than that of the solid electrolyte particles 100. With this configuration, the positive electrode active material particles 204 and the solid electrolyte particles 100 may be well dispersed in the positive electrode 201.

In order to increase the energy density and the output of the battery, the ratio of the volume of the positive electrode active material particles 204 to the total of the volume of the positive electrode active material particles 204 and the volume of the solid electrolyte particles 100 in the positive electrode 201 may be greater than or equal to 0.30 and less than or equal to 0.95.

In order to increase the energy density and the output of the battery, the positive electrode 201 may have a thickness of greater than or equal to 10 μm and less than or equal to 500 μm.

The electrolyte layer 202 contains an electrolyte material. For example, the electrolyte material is the solid electrolyte material according to the first embodiment. The electrolyte layer 202 may be a solid electrolyte layer.

The electrolyte layer 202 may be composed solely of the solid electrolyte material according to the first embodiment. Alternatively, the electrolyte layer 202 may be composed solely of a solid electrolyte material different from the solid electrolyte material according to the first embodiment.

Examples of the solid electrolyte materials different from the solid electrolyte materials according to the first embodiment include $Li_2MgX'_4$, $Li_2FeX'_4$, $Li(Al, Ga, In)X'_4$, $Li_3$ (Al, Ga, In)$X'_6$, and LiI. Here, X' is at least one selected from the group consisting of F, Cl, Br, and I. That is, the solid electrolyte material different from the solid electrolyte material according to the first embodiment may be a solid electrolyte including a halogen element, namely, a halide solid electrolyte.

Hereinafter, the solid electrolyte material according to the first embodiment will be written as the first solid electrolyte material. The solid electrolyte material different from the solid electrolyte material according to the first embodiment will be written as the second solid electrolyte material.

The electrolyte layer 202 may contain not only the first solid electrolyte material but also the second solid electrolyte material. In the electrolyte layer 202, the first solid electrolyte material and the second solid electrolyte material may be uniformly dispersed. A layer made of the first solid electrolyte material and a layer made of the second solid electrolyte material may be stacked along the stacking direction of the battery 1000.

The electrolyte layer 202 may have a thickness of greater than or equal to 1 μm and less than or equal to 1000 μm. When the electrolyte layer 202 has a thickness of greater than or equal to 1 μm, the positive electrode 201 and the negative electrode 203 are unlikely to be short-circuited. When the electrolyte layer 202 has a thickness of less than or equal to 1000 μm, the battery may be operated at a high output.

The negative electrode 203 contains a material capable of occluding and releasing metal ions, such as lithium ions. For example, the material is a negative electrode active material (for example, the negative electrode active material particles 205).

Examples of the negative electrode active materials include metal materials, carbon materials, oxides, nitrides, tin compounds, and silicon compounds. The metal materials may be elemental metals or alloys. Examples of the metal materials include lithium metal and lithium alloys. Examples of the carbon materials include natural graphites, cokes, semi-graphitized carbons, carbon fibers, spherical carbons, artificial graphites, and amorphous carbons. From the point of view of capacitance density, for example, silicon (that is, Si), tin (that is, Sn), silicon compounds, and tin compounds are preferable as the negative electrode active materials.

The negative electrode active material particles 205 may have a median diameter of greater than or equal to 0.1 μm and less than or equal to 100 μm. When the negative electrode active material particles 205 have a median diameter of greater than or equal to μm, the negative electrode active material particles 205 and the solid electrolyte particles 100 may be well dispersed in the negative electrode 203. As a result, charge-discharge characteristics of the battery are enhanced. When the negative electrode active material particles 205 have a median diameter of less than or equal to 100 μm, the lithium diffusion rate in the negative electrode active material particles 205 is enhanced. Consequently, the battery may be operated at a high output.

The negative electrode active material particles 205 may have a median diameter larger than that of the solid electrolyte particles 100. With this configuration, the negative electrode active material particles 205 and the solid electrolyte particles 100 may be well dispersed in the negative electrode 203.

In order to increase the energy density and the output of the battery, the ratio of the volume of the negative electrode active material particles 205 to the total of the volume of the negative electrode active material particles 205 and the volume of the solid electrolyte particles 100 in the negative electrode 203 may be greater than or equal to 0.30 and less than or equal to 0.95.

In order to increase the energy density and the output of the battery, the negative electrode 203 may have a thickness of greater than or equal to 10 μm and less than or equal to 500 μm.

At least one selected from the group consisting of the positive electrode 201, the electrolyte layer 202, and the negative electrode 203 may contain the second solid electrolyte material for the purpose of enhancing ion conductive properties, chemical stability, and electrochemical stability.

As already described, the second solid electrolyte material may be a halide solid electrolyte.

Examples of the halide solid electrolytes include $Li_2MgX'_4$, $Li_2FeX'_4$, Li(Al, Ga, In)$X'_4$, $Li_3$ (Al, Ga, In)$X'_6$, and LiI. Here, X' is at least one selected from the group consisting of F, Cl, Br, and I.

Examples of the halide solid electrolytes further include compounds represented by $Li_pMe_qY_rZ_6$. Here, p+m'q+3r=6 and r>0 are satisfied. Me is at least one element selected from the group consisting of metal elements other than Li and Y, and metalloid elements. The value of m' indicates the valence of Me. Z is at least one selected from the group consisting of F, Cl, Br, and I. The "metalloid elements" are B, Si, Ge, As, Sb, and Te. The "metal elements" are all the elements in Groups 1 to 12 of the periodic table (except hydrogen), and all the elements in Groups 13 to 16 of the periodic table (except B, Si, Ge, As, Sb, Te, C, N, P, O, S, and Se). In order to increase the ion conductivity of the halide solid electrolyte, Me may be at least one selected from the group consisting of Mg, Ca, Sr, Ba, Zn, Sc, Al, Ga, Bi, Zr, Hf, Ti, Sn, Ta, and Nb.

The second solid electrolyte material may be a sulfide solid electrolyte.

Examples of the sulfide solid electrolytes include $Li_2S—P_2S_5$, $Li_2S—SiS_2$, $Li_2S—B_2S_3$, $Li_2S—GeS_2$, $Li_{3.25}Geo_{0.25}P_{0.75}S_4$, and $Li_{10}GeP_2S_{12}$.

The second solid electrolyte material may be an oxide solid electrolyte.

Examples of the oxide solid electrolytes include:

(i) NASICON-type solid electrolytes, such as $LiTi_2(PO_4)_3$ and element-substituted derivatives thereof, (ii) perovskite-type solid electrolytes, such as $(LaLi)TiO_3$, (iii) LISICON-type solid electrolytes, such as $Li_{14}ZnGe_4O_{16}$, $Li_4SiO_4$, $LiGeO_4$, and element-substituted derivatives thereof, (iv) garnet-type solid electrolytes, such as $Li_7La_3Zr_2O_{12}$ and element-substituted derivatives thereof, and (v) $Li_3PO_4$ and N-substituted derivatives thereof.

The second solid electrolyte material may be an organic polymer solid electrolyte.

Examples of the organic polymer solid electrolytes include polymer compounds and compounds of lithium salts.

The polymer compounds may have an ethylene oxide structure. The polymer compounds having an ethylene oxide structure can contain a large amount of a lithium salt, and thus the ion conductivity may be further increased.

Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A single kind of a lithium salt selected from these may be used singly. Alternatively, a mixture of two or more kinds of lithium salts selected from the above may be used.

At least one selected from the group consisting of the positive electrode 201, the electrolyte layer 202, and the negative electrode 203 may contain a nonaqueous electrolytic solution, a gel electrolyte, or an ionic liquid for the purposes of facilitating the transfer of lithium ions and enhancing output characteristics of the battery.

The nonaqueous electrolytic solution includes a nonaqueous solvent and a lithium salt dissolved in the nonaqueous solvent.

Examples of the nonaqueous solvents include cyclic carbonate ester solvents, chain carbonate ester solvents, cyclic ether solvents, chain ether solvents, cyclic ester solvents, chain ester solvents, and fluorine solvents. Examples of the cyclic carbonate ester solvents include ethylene carbonate, propylene carbonate, and butylene carbonate. Examples of the chain carbonate ester solvents include dimethyl carbonate, ethyl methyl carbonate, and diethyl carbonate. Examples of the cyclic ether solvents include tetrahydrofuran, 1,4-dioxane, and 1,3-dioxolane. Examples of the chain ether solvents include 1,2-dimethoxyethane and 1,2-diethoxyethane. Examples of the cyclic ester solvents include γ-butyrolactone. Examples of the chain ester solvents include methyl acetate. Examples of the fluorine solvents include fluoroethylene carbonate, methyl fluoropropionate, fluorobenzene, fluoroethyl methyl carbonate, and fluorodimethylene carbonate. A single kind of a nonaqueous solvent selected from these may be used singly. Alternatively, a mixture of two or more kinds of nonaqueous solvents selected from the above may be used.

Examples of the lithium salts include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. A single kind of a lithium salt selected from these may be used singly. Alternatively, a mixture of two or more kinds of lithium salts selected from the above may be used. For example, the concentration of the lithium salt is greater than or equal to 0.5 mol/L and less than or equal to 2 mol/L.

The gel electrolyte may be a polymer material impregnated with a nonaqueous electrolytic solution. Examples of the polymer materials include polyethylene oxide, polyacrylonitrile, polyvinylidene fluoride, polymethyl methacrylate, and polymers having ethylene oxide bonds.

Examples of the cations contained in the ionic liquids include:

(i) aliphatic chain quaternary salts, such as tetraalkyl ammoniums and tetraalkyl phosphoniums, (ii) aliphatic cyclic ammoniums, such as pyrrolidiniums, morpholiniums, imidazoliniums, tetrahydropyrimidiniums, piperaziniums, and piperidiniums, and (iii) nitrogen-containing heterocyclic aromatic cations, such as pyridiniums and imidazoliums.

Examples of the anions contained in the ionic liquids include $PF_6^-$, $BF_4^-$, $SbF_6^-$, $ASF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

At least one selected from the group consisting of the positive electrode 201, the electrolyte layer 202, and the negative electrode 203 may contain a binder for the purpose of enhancing the adhesion between the particles.

Examples of the binders include polyvinylidene fluoride, polytetrafluoroethylene, polyethylene, polypropylene, aramid resins, polyamide, polyimide, polyamidimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, styrene butadiene rubber, and carboxymethylcellulose. Copolymers may also be used as the binders. Examples of such binders include copolymers of two or more kinds of materials selected from the group consisting of tetrafluoroethylene, hexafluoroethylene, hexafluoropropylene, perfluoroalkyl vinyl ethers, vinylidene fluoride, chlorotrifluoroethylene, ethylene, propylene, pentafluoropropylene, fluoromethyl vinyl ether, acrylic acid, and hexadiene. A mixture of two or more kinds of materials selected from the above may be used as the binder.

At least one selected from the positive electrode 201 and the negative electrode 203 may contain a conductive auxiliary for the purpose of enhancing the electron conductivity.

Examples of the conductive auxiliaries include:

(i) graphites, such as natural graphites and artificial graphites, (ii) carbon blacks, such as acetylene blacks and Ketjen blacks, (iii) conductive fibers, such as carbon fibers and metal fibers, (iv) carbon fluoride, (v) metal powders, such as aluminum, (vi) conductive whiskers, such as zinc oxide and potassium titanate, (vii) conductive metal oxides, such as titanium oxide, and (viii) conductive polymer compounds, such as polyaniline, polypyrrole, and polythiophene. To reduce the cost, a conductive auxiliary belonging to (i) or (ii) may be used.

Examples of the shapes of the batteries according to the second embodiment include coin shapes, cylindrical shapes, prismatic shapes, sheet shapes, button shapes, flat shapes, and laminate shapes.

For example, the battery according to the second embodiment may be produced by providing materials for forming the positive electrode, materials for forming the electrolyte layer, and materials for forming the negative electrode, and fabricating a stack by a known method in which the positive electrode, the electrolyte layer, and the negative electrode are arranged in this order.

EXAMPLES

Hereinbelow, the present disclosure will be described in greater detail with reference to EXAMPLES and COMPARATIVE EXAMPLES.

Solid electrolyte materials of EXAMPLES may be represented by the compositional formula (1) described hereinabove.

Example 1

Preparation of Solid Electrolyte Material

In an argon atmosphere having a dew point of less than or equal to −60° C. (hereinafter, written as "dry argon atmosphere"), LiBr, LiCl, and $YbCl_3$ as ingredient powders were provided in a molar ratio $LiBr:LiCl:YbCl_3$=0.75:2.25:1. These ingredient powders were crushed and mixed together in an agate mortar. The mixed powder obtained was placed into an alumina crucible and was heat-treated in a dry argon atmosphere at 550° C. for 1 hour. The heat-treated product obtained was crushed in an agate mortar. A powder of a solid electrolyte material of EXAMPLE 1 was thus obtained. The solid electrolyte material of EXAMPLE 1 had a composition represented by $Li_3YbBr_{0.75}Cl_{5.25}$.

Evaluation of Ion Conductivity

Figure 2:
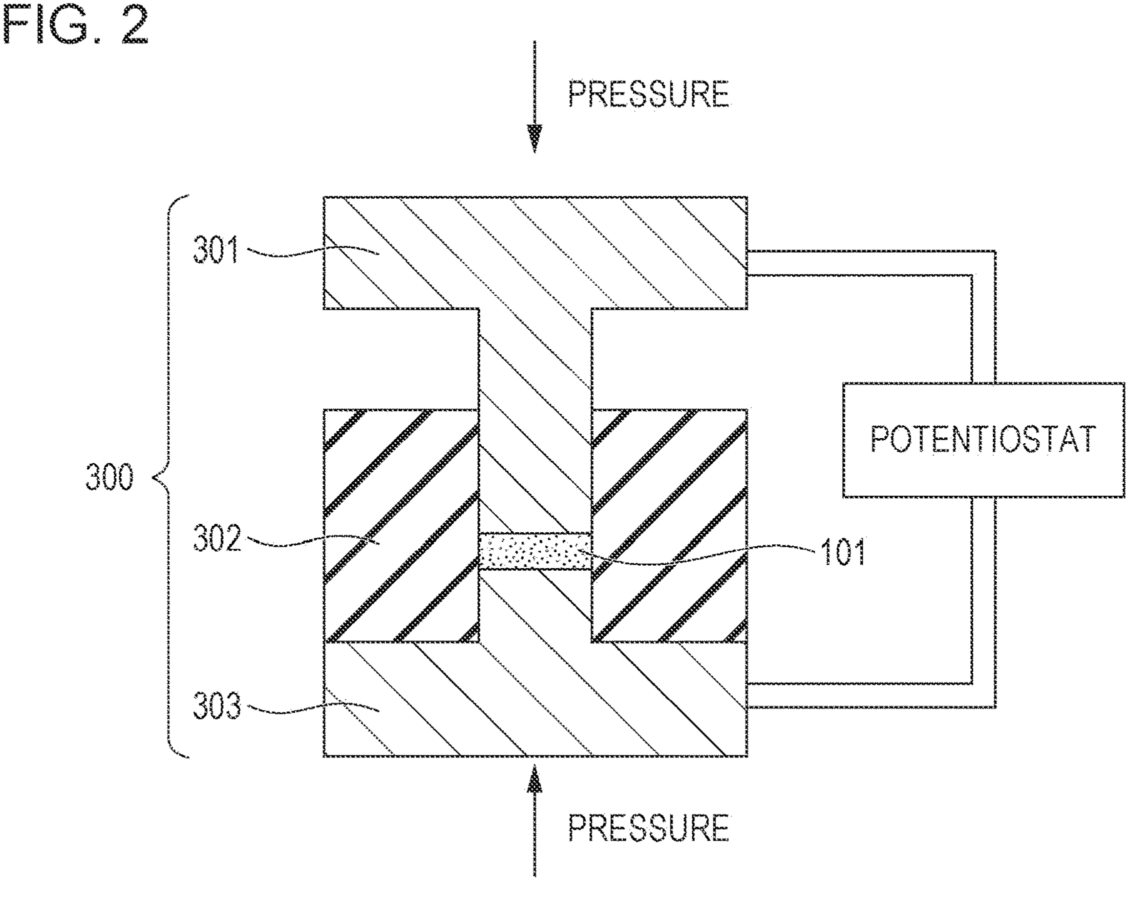
FIG. 2 illustrates a schematic view of a pressure forming die 300 used to evaluate the ion conductivity of a solid electrolyte material.

FIG. 2 illustrates a schematic view of a pressure forming die 300 used to evaluate the ion conductivity of the solid electrolyte material.

The pressure forming die 300 included an upper punch 301, a die 302, and a lower punch 303. The upper punch 301 and the lower punch 303 were each formed of electron-conductive stainless steel. The die 302 was formed of an insulating polycarbonate.

Using the pressure forming die 300 illustrated in FIG. 2, the ion conductivity of the solid electrolyte material of EXAMPLE 1 was evaluated by the following method.

In a dry argon atmosphere, the powder of the solid electrolyte material of EXAMPLE 1 was charged to fill the inside of the pressure forming die 300. Inside the pressure forming die 300, a pressure of 360 MPa was applied to the powder 101 of the solid electrolyte material of EXAMPLE 1 using the upper punch 301 and the lower punch 303.

While maintaining the pressure, the upper punch 301 and the lower punch 303 were connected to a potentiostat (Princeton Applied Research, Versa STAT 4) equipped with a frequency response analyzer. The upper punch 301 was connected to the working electrode and the potential measuring terminal. The lower punch 303 was connected to the counter electrode and the reference electrode. The impedance of the solid electrolyte material was measured at room temperature by an electrochemical impedance measurement method.

Figure 3:
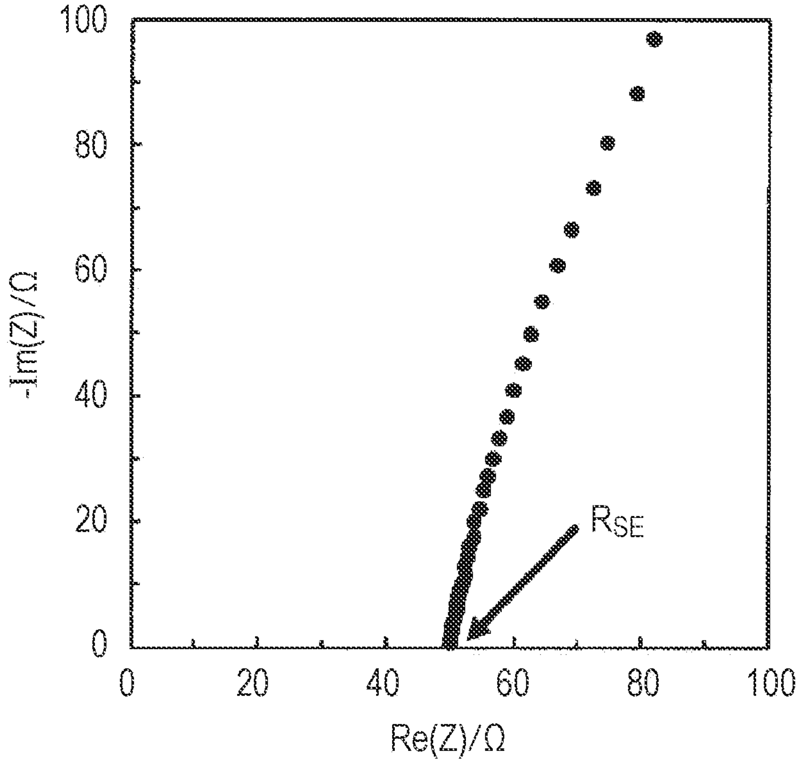
FIG. 3 is a graph illustrating a Cole-Cole plot obtained by alternating current (AC) impedance measurement of a solid electrolyte material of EXAMPLE 1.

FIG. 3 is a graph illustrating the Cole-Cole plot obtained by the AC impedance measurement of the solid electrolyte material of EXAMPLE 1.

In FIG. 3, the real value of impedance at the measurement point where the absolute value of the complex impedance phase was smallest was taken as the value of resistance of the solid electrolyte material to ion conduction. For the real value, refer to the arrow $R_{SE}$ illustrated in FIG. 3. Using the resistance value, the ion conductivity was calculated based on the following equation (2).

$$\sigma=(R_{SE}\times S/t)^{-1} \quad (2)$$

Here, a indicates the ion conductivity. S represents the area of contact between the solid electrolyte material and the upper punch 301. Specifically, S is equal to the sectional area of the hollow portion of the die 302 in FIG. 2. $R_{SE}$ indicates the resistance value of the solid electrolyte material in the impedance measurement. The letter t represents the thickness of the solid electrolyte material. Specifically, the letter t is equal to the thickness of the layer formed of the powder 101 of the solid electrolyte material in FIG. 2.

The ion conductivity of the solid electrolyte material of EXAMPLE 1 measured at 25° C. was $1.11\times10^{-3}$ S/cm.

X-Ray Diffractometry

Figure 4:
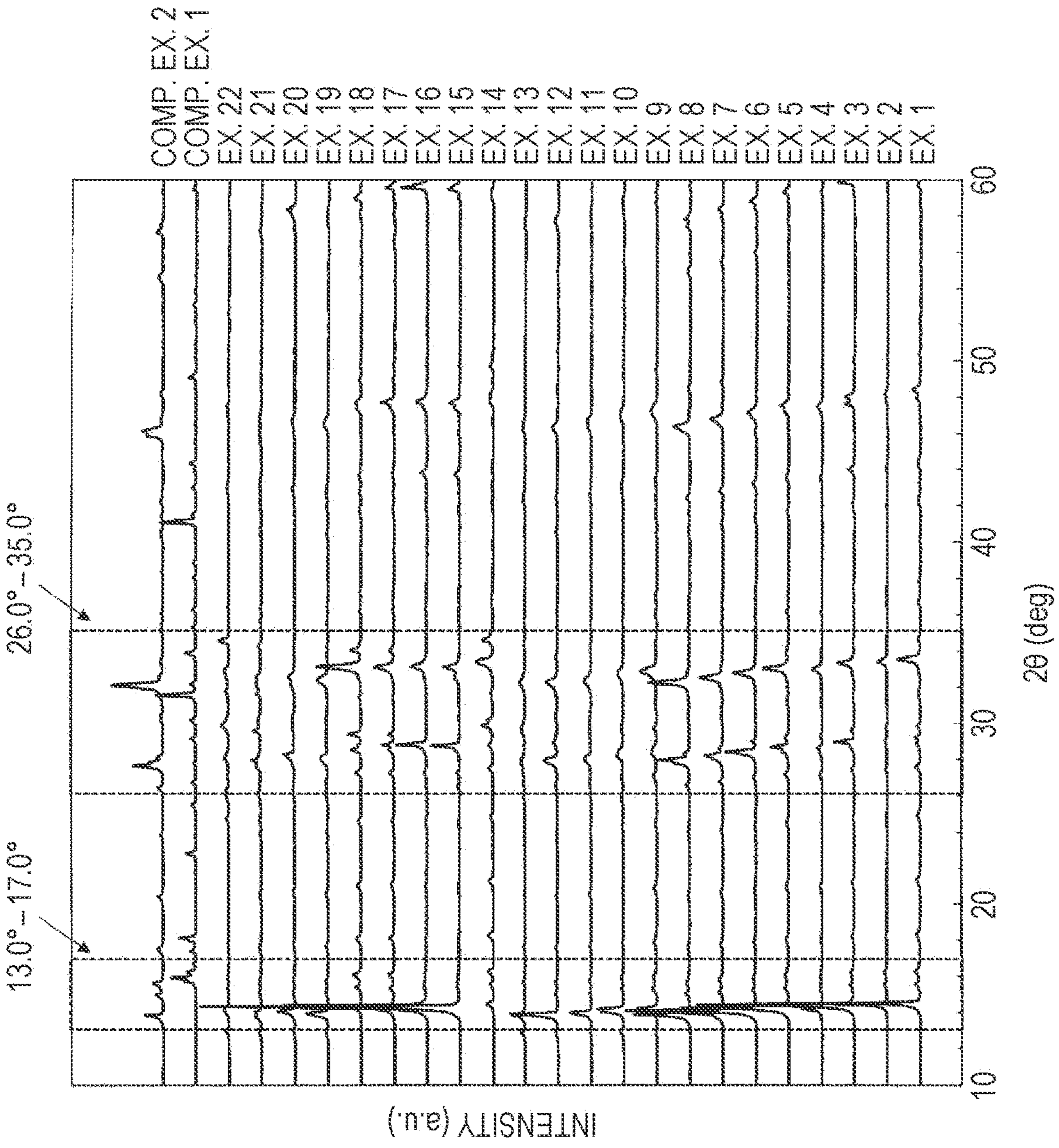
FIG. 4 is a graph illustrating X-ray diffraction patterns of solid electrolyte materials of EXAMPLES 1 to 22, and COMPARATIVE EXAMPLES 1 and 2.

FIG. 4 is a graph illustrating an X-ray diffraction pattern of the solid electrolyte material of EXAMPLE 1. The results illustrated in FIG. 4 were measured by the following method.

The solid electrolyte material of EXAMPLE 1 was analyzed on an X-ray diffractometer (MiniFlex 600, Rigaku Corporation) in a dry environment having a dew point of less than or equal to −50° C. to measure an X-ray diffraction pattern. The X-ray diffraction pattern was measured by a θ-2θ method using Cu-Kα radiation (1.5405 Å and 1.5444 Å wavelengths) as the X-ray source.

The X-ray diffraction pattern of the solid electrolyte material of EXAMPLE 1 had two peaks in the range of greater than or equal to 26.0° and less than or equal to 35.0°, and one peak in the range of greater than or equal to 13.0° and less than or equal to 17.0°. Thus, the solid electrolyte material of EXAMPLE 1 contained a first crystal phase (namely, a monoclinic crystal). The angles of the distinct X-ray diffraction peaks observed of the first crystal phase are described in Table 2.

Fabrication of Battery

In a dry argon atmosphere, the solid electrolyte material of EXAMPLE 1 and $LiCoO_2$ were provided in a volume ratio of 30:70. These materials were mixed together in a mortar to give a mixture.

In an insulating cylinder having an inner diameter of 9.5 mm, the solid electrolyte material (80 mg) of EXAMPLE 1 and the above mixture (10 mg) were stacked in this order. A pressure of 720 MPa was applied to the resultant stack to form a solid electrolyte layer made of the solid electrolyte material of EXAMPLE 1 and a positive electrode made of the mixture. The solid electrolyte layer had a thickness of 400 μm.

Next, metallic In (200 μm thick), metallic Li (200 μm thick), and metallic In (200 μm thick) were stacked sequentially onto the solid electrolyte layer. A pressure of 80 MPa was applied to the resultant stack to form a negative electrode.

Next, current collectors formed of stainless steel were attached to the positive electrode and the negative electrode, and current collector leads were attached to the current collectors.

Lastly, the inside of the insulating cylinder was isolated from the outside atmosphere with use of an insulating ferrule. The inside of the cylinder was thus sealed. A battery of EXAMPLE 1 was thus obtained.

Charging-Discharging Test

Figure 5:
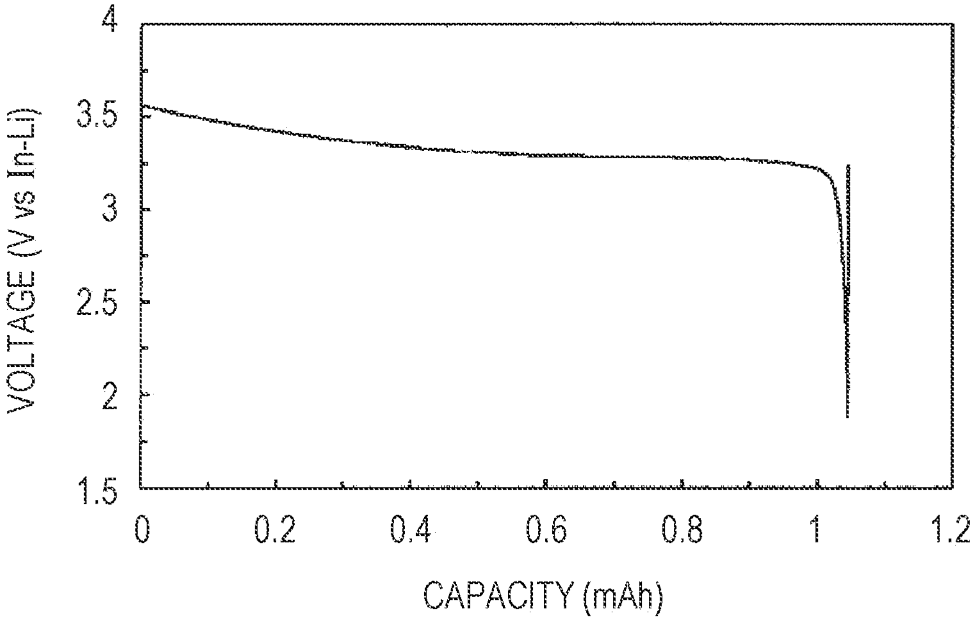
FIG. 5 is a graph illustrating initial discharge characteristics of a battery of EXAMPLE 1.

FIG. 5 is a graph illustrating initial discharge characteristics of the battery of EXAMPLE 1. Initial charge-discharge characteristics were measured by the following method.

The battery of EXAMPLE 1 was placed in a thermostatic chamber at 25° C.

The battery of EXAMPLE 1 was charged at a current density of 54 μA/cm 2 until the voltage reached 3.68 V. The current density corresponds to 0.05 C rate.

Next, the battery of EXAMPLE 1 was discharged at a current density of 54 μA/cm 2 until the voltage fell to 1.88 V.

As a result of the charging-discharging test, the battery of EXAMPLE 1 had an initial discharge capacity of 1.05 mAh.

Examples 2 to 22

Preparation of Solid Electrolyte Materials

In EXAMPLE 2, LiBr, LiCl, and $YbCl_3$ as ingredient powders were provided in a molar ratio of LiBr:LiCl:$YbCl_3$=1:2:1.

In EXAMPLE 3, LiBr, LiCl, and $YbCl_3$ as ingredient powders were provided in a molar ratio of LiBr:LiCl:$YbCl_3$=1.5:1.5:1.

In EXAMPLE 4, LiBr, LiCl, and $YbCl_3$ as ingredient powders were provided in a molar ratio of LiBr:LiCl:$YbCl_3$=2:1:1.

In EXAMPLE 5, LiBr, LiCl, and $YbCl_3$ as ingredient powders were provided in a molar ratio of LiBr:LiCl:$YbCl_3$=2.25:0.75:1.

In EXAMPLE 6, LiBr and $YbCl_3$ as ingredient powders were provided in a molar ratio of LiBr:$YbCl_3$=3:1.

In EXAMPLE 7, LiBr, LiCl, and $YbBr_3$ as ingredient powders were provided in a molar ratio of LiBr:LiCl:$YbBr_3$=1:2:1.

In EXAMPLE 8, LiBr, LiCl, and $YbBr_3$ as ingredient powders were provided in a molar ratio of LiBr:LiCl:$YbBr_3$=2:1:1.

In EXAMPLE 9, LiCl, LiBr, LiI, and $YbCl_3$ as ingredient powders were provided in a molar ratio of LiCl:LiBr:Lit$YbCl_3$=1:1.5:0.5:1.

In EXAMPLE 10, LiCl, LiBr, LiI, and $YbCl_3$ as ingredient powders were provided in a molar ratio of LiCl:LiBr:LiI:$YbCl_3$=0.5:1.5:1:1.

In EXAMPLE 11, LiBr, LiI, and $YbCl_3$ as ingredient powders were provided in a molar ratio of LiBr:LiI:$YbCl_3$=2:1:1.

In EXAMPLE 12, LiBr, LiI, $YbCl_3$, and $YbBr_3$ as ingredient powders were provided in a molar ratio of LiBr:LiLY$bCl_3$:$YbBr_3$=2:1:0.83:0.17.

In EXAMPLE 13, LiBr, LiI, and $YbCl_3$ as ingredient powders were provided in a molar ratio of LiBr:LiI:$YbCl_3$=1.5:1.5:1.

In EXAMPLE 14, LiBr, LiI, $YbCl_3$, and $YbBr_3$ as ingredient powders were provided in a molar ratio of LiBr:LiLY$bCl_3$:$YbBr_3$=1:2:0.67:0.33.

In EXAMPLE 15, LiBr, LiCl, and $YbCl_3$ as ingredient powders were provided in a molar ratio of LiBr:LiCl:$YbCl_3$=2:0.4:1.2.

In EXAMPLE 16, LiBr, LiCl, and $YbCl_3$ as ingredient powders were provided in a molar ratio of LiBr:LiCl:$YbCl_3$=2:0.7:1.1.

In EXAMPLE 17, LiBr, LiCl, and $YbCl_3$ as ingredient powders were provided in a molar ratio of LiBr:LiCl:$YbCl_3$=2:1.3:0.9.

In EXAMPLE 18, LiBr, LiCl, and $YbCl_3$ as ingredient powders were provided in a molar ratio of LiBr:LiCl:$YbCl_3$=2:1.6:0.8.

In EXAMPLE 19, LiBr, LiI, LiF, and $YbCl_3$ as ingredient powders were provided in a molar ratio of LiBr:LiI:LiF:$YbCl_3$=1.9:1:0.1:1.

In EXAMPLE 20, LiBr, LiI, LiF, and $YbCl_3$ as ingredient powders were provided in a molar ratio of LiBr:LiI:LiF:$YbCl_3$=1.7:1:0.3:1.

In EXAMPLE 21, LiBr, LiI, LiF, and $YbCl_3$ as ingredient powders were provided in a molar ratio of LiBr:LiI:LiF:$YbCl_3$=1.5:1:0.5:1.

In EXAMPLE 20, LiBr, LiI, LiF, and $YbCl_3$ as ingredient powders were provided in a molar ratio of LiBr:LiI:LiF:$YbCl_3$=1:1:1:1.

In EXAMPLES 2 to 8, and 15 to 18, the mixture of the ingredient powders was heat-treated in a dry argon atmosphere at 550° C. for 1 hour.

In EXAMPLES 9 to 14, and 19 to 22, the mixture of the ingredient powders was heat-treated in a dry argon atmosphere at 480° C. for 1 hour.

Solid electrolyte materials of EXAMPLES 2 to 22 were obtained in the same manner as in EXAMPLE 1 except for the above differences.

Evaluation of Ion Conductivity

The ion conductivity of the solid electrolyte materials of EXAMPLES 2 to 22 was measured in the same manner as in EXAMPLE 1. The measurement results are described in Table 1.

X-Ray Diffractometry

X-ray diffraction patterns of the solid electrolyte materials of EXAMPLES 2 to 22 were measured in the same manner as in EXAMPLE 1.

FIG. 4 is a graph illustrating the X-ray diffraction patterns of the solid electrolyte materials of EXAMPLES 2 to 22. The solid electrolyte materials of EXAMPLES 2 to 22 contained a first crystal phase. The angles of the distinct X-ray diffraction peaks observed of the first crystal phase are described in Table 2.

Charging-Discharging Test

Batteries of EXAMPLES 2 to 22 were obtained in the same manner as in EXAMPLE 1 using the solid electrolyte materials of EXAMPLES 2 to 22. The batteries of EXAMPLES 2 to 22 were subjected to the charging-discharging test in the same manner as in EXAMPLE 1. As a result, the batteries of EXAMPLES 2 to 22 were charged and discharged satisfactorily similarly to the battery of EXAMPLE 1.

Comparative Examples 1 and 2

Preparation of Solid Electrolyte Materials

In COMPARATIVE EXAMPLE 1, LiCl and $YbCl_3$ as ingredient powders were provided in a molar ratio of LiCl:$YbCl_3$=3:1. The mixture of the ingredient powders was heat-treated in a dry argon atmosphere at 600° C. for 1 hour.

In COMPARATIVE EXAMPLE 2, LiBr and $YbBr_3$ as ingredient powders were provided in a molar ratio of LiBr:$YbBr_3$=3:1. The mixture of the ingredient powders was heat-treated in a dry argon atmosphere at 550° C. for 1 hour.

Solid electrolyte materials of COMPARATIVE EXAMPLES 1 and 2 were obtained in the same manner as in EXAMPLE 1 except for the above differences.

Evaluation of Ion Conductivity

The ion conductivity of the solid electrolyte materials of COMPARATIVE EXAMPLES 1 and 2 was measured in the same manner as in EXAMPLE 1. The measurement results are described in Table 1.

X-Ray Diffractometry

X-ray diffraction patterns of the solid electrolyte materials of COMPARATIVE EXAMPLES 1 and 2 were measured in the same manner as in EXAMPLE 1.

FIG. 4 is a graph illustrating the X-ray diffraction patterns of the solid electrolyte materials of COMPARATIVE EXAMPLES 1 and 2. The solid electrolyte material of COMPARATIVE EXAMPLE 2 contained a first crystal phase. The solid electrolyte material of COMPARATIVE EXAMPLE 1 contained an orthorhombic crystal phase. The angles of the distinct X-ray diffraction peaks observed of the first crystal phase are described in Table 2.

The compositions of the solid electrolyte materials of EXAMPLES and COMPARATIVE EXAMPLES are described in Table 1. Table 1 also describes the values corresponding to a, x, y, and z in the compositional formula (1).

TABLE 1

| | Composition | a | x | y | z | Ion conductivity (S/cm) |
|---|---|---|---|---|---|---|
| EX. 1 | $Li_3YbCl_{5.25}Br_{0.75}$ | 1 | 0.75 | 0 | 0 | $1.11 \times 10^{-3}$ |
| EX. 2 | $Li_3YbCl_5Br_1$ | 1 | 1 | 0 | 0 | $9.49 \times 10^{-4}$ |
| EX. 3 | $Li_3YbCl_{4.5}Br_{1.5}$ | 1 | 1.5 | 0 | 0 | $1.50 \times 10^{-3}$ |
| EX. 4 | $Li_3YbCl_4Br_2$ | 1 | 2 | 0 | 0 | $1.22 \times 10^{-3}$ |
| EX. 5 | $Li_3YbCl_{3.75}Br_{2.25}$ | 1 | 2.25 | 0 | 0 | $1.79 \times 10^{-3}$ |
| EX. 6 | $Li_3YbCl_3Br_3$ | 1 | 3 | 0 | 0 | $2.37 \times 10^{-3}$ |
| EX. 7 | $Li_3YbCl_2Br_4$ | 1 | 4 | 0 | 0 | $8.34 \times 10^{-4}$ |
| EX. 8 | $Li_3YbCl_1Br_5$ | 1 | 5 | 0 | 0 | $1.29 \times 10^{-4}$ |
| EX. 9 | $Li_3YbCl_4Br_{1.5}I_{0.5}$ | 1 | 1.5 | 0.5 | 0 | $1.83 \times 10^{-3}$ |
| EX. 10 | $Li_3YbCl_{3.5}Br_{1.5}I_1$ | 1 | 1.5 | 1 | 0 | $1.14 \times 10^{-3}$ |
| EX. 11 | $Li_3YbCl_3Br_2I_1$ | 1 | 2 | 1 | 0 | $1.70 \times 10^{-3}$ |
| EX. 12 | $Li_3YbCl_{2.5}Br_{2.5}I_1$ | 1 | 2.5 | 1 | 0 | $1.45 \times 10^{-3}$ |
| EX. 13 | $Li_3YbCl_3Br_{1.5}I_{1.5}$ | 1 | 1.5 | 1.5 | 0 | $6.40 \times 10^{-4}$ |

TABLE 1-continued

| | Composition | a | x | y | z | Ion conductivity (S/cm) |
|---|---|---|---|---|---|---|
| EX. 14 | $Li_3YbCl_2Br_2I_2$ | 1 | 2 | 2 | 0 | $3.02 \times 10^{-4}$ |
| EX. 15 | $Li_{2.4}Yb_{1.2}Cl_4Br_2$ | 1.2 | 2 | 0 | 0 | $2.90 \times 10^{-4}$ |
| EX. 16 | $Li_{2.7}Yb_{1.1}Cl_4Br_2$ | 1.1 | 2 | 0 | 0 | $3.47 \times 10^{-4}$ |
| EX. 17 | $Li_{3.3}Yb_{0.9}Cl_4Br_2$ | 0.9 | 2 | 0 | 0 | $9.20 \times 10^{-4}$ |
| EX. 18 | $Li_{3.6}Yb_{0.8}Cl_4Br_2$ | 0.8 | 2 | 0 | 0 | $8.21 \times 10^{-4}$ |
| EX. 19 | $Li_3YbCl_3Br_{1.9}I_1F_{0.1}$ | 1 | 1.9 | 1 | 0.1 | $1.33 \times 10^{-3}$ |
| EX. 20 | $Li_3YbCl_3Br_{1.7}I_1F_{0.3}$ | 1 | 1.7 | 1 | 0.3 | $9.54 \times 10^{-4}$ |
| EX. 21 | $Li_3YbCl_3Br_{1.5}I_1F_{0.5}$ | 1 | 1.5 | 1 | 0.5 | $1.03 \times 10^{-3}$ |
| EX. 22 | $Li_3YbCl_3Br_1I_1F_1$ | 1 | 1 | 1 | 1 | $4.64 \times 10^{-4}$ |
| COMP. EX. 1 | $Li_3YbCl_6$ | 1 | 0 | 0 | 0 | $4.98 \times 10^{-5}$ |
| COMP. EX. 2 | $Li_3YbBr_6$ | 1 | 6 | 0 | 0 | $3.31 \times 10^{-5}$ |

TABLE 2

| | Angles of distinct diffraction peaks assigned to first crystal phase (°) | |
|---|---|---|
| | 13.0° to 17.0° | 26.0° to 35.0° |
| EX. 1 | 14.52 | 29.23, 33.55 |
| EX. 2 | 14.45 | 29.08, 33.40 |
| EX. 3 | 14.41 | 28.96, 33.36 |
| EX. 4 | 14.19 | 28.63, 33.01 |
| EX. 5 | 14.26 | 28.70, 33.03 |
| EX. 6 | 14.11 | 28.42, 32.79 |
| EX. 7 | 14.00 | 28.21, 32.53 |
| EX. 8 | 13.88 | 27.98, 32.26 |
| EX. 9 | 14.19 | 28.36, 32.87 |
| EX. 10 | 14.18 | 28.20, 32.79 |
| EX. 11 | 13.99 | 27.90, 32.38 |
| EX. 12 | 13.89 | 27.97, 32.29 |
| EX. 13 | 13.88 | 27.91, 32.22 |
| EX. 14 | 14.46 | 29.87, 33.40 |
| EX. 15 | 14.27 | 28.74, 33.10 |
| EX. 16 | 14.33 | 28.81, 33.14 |
| EX. 17 | 14.30 | 28.81, 33.11 |
| EX. 18 | 14.27 | 29.38, 33.14 |
| EX. 19 | 13.95 | 28.05, 32.41 |
| EX. 20 | 14.07 | 28.28, 32.60 |
| EX. 21 | 14.07 | 27.95, 32.64 |
| EX. 22 | 14.18 | 28.12, 32.96 |
| COMP. EX. 1 | — | — |
| COMP. EX. 2 | 13.84 | 27.67, 32.11 |

DISCUSSION

The solid electrolyte materials of EXAMPLES 1 to 22 have a high lithium ion conductivity of greater than or equal to $5.0\times10^{-5}$ S/cm near room temperature.

As is clear from the comparison of EXAMPLES 1 to 22 with COMPARATIVE EXAMPLES 1 and 2, the solid electrolyte materials that are represented by the compositional formula (1) and contain at least two selected from the group consisting of F, Cl, Br, and I as X exhibit markedly high ion conductivity as compared to when the solid electrolytes contain one element as X. This is probably because the incorporation of at least two selected from the group consisting of F, Cl, Br, and I as X facilitates the occurrence of lithium ion diffusion pathways in the crystal lattices.

The solid electrolyte materials of EXAMPLES 1 to 22 have a first crystal phase. The materials containing a first crystal phase are highly likely to have lithium ion diffusion pathways in the crystal lattices and tend to exhibit high lithium ion conductive properties.

As is clear from the comparison of EXAMPLES 1 to 8 with COMPARATIVE EXAMPLES 1 and 2, the solid electrolyte materials have high ion conductivity when the value of x is greater than 0 (or greater than or equal to 0.75) and less than 6 (or less than or equal to 5). This is probably because lithium ion diffusion pathways occur easily in the crystal lattices. In particular, the solid electrolyte material in which the value of x is equal to 0 has an orthorhombic crystal phase, while the solid electrolyte material has a monoclinic crystal phase (that is, a first crystal phase) and tends to exhibit high lithium ion conductive properties when the value of x is greater than or equal to 0.75. Furthermore, as is clear from the comparison of EXAMPLES 1 to 6 with EXAMPLES 7 and 8, the solid electrolyte materials have higher ion conductivity when the value of x is greater than 0 and less than or equal to 3. This is probably because the size of the $YbX_6$ octahedrons in the crystal lattices is optimized to promote the occurrence of lithium ion conductive pathways. In addition, the solid electrolyte materials have still higher ion conductivity when the value of x is greater than or equal to 1.5 and less than or equal to 3. This is probably because the size of the $YbX_6$ octahedrons is further optimized to highly promote the occurrence of lithium ion conductive pathways.

As is clear from EXAMPLES 1 to 14, the solid electrolyte materials have high ion conductivity when the value of y is greater than or equal to 0 and less than or equal to 2. This is probably because lithium ion diffusion pathways occur easily. In addition, as is clear from the comparison of EXAMPLES 9 to 12 with EXAMPLES 13 and 14, the solid electrolyte materials have higher ion conductivity when the value of y is greater than or equal to 0.5 and less than or equal to 1. This is probably because a first crystal phase having high lithium ion conductive properties is formed easily.

As is clear from EXAMPLES 4 and 15 to 18, the solid electrolyte materials have high ion conductivity when the value of a is greater than or equal to 0.8 and less than or equal to 1.2. This is probably because a first crystal phase having high lithium ion conductive properties is formed easily. Furthermore, as is clear from the comparison of EXAMPLES 4, 17, and 18 with EXAMPLES 15 and 16, the solid electrolyte materials have higher ion conductivity when the value of a is greater than or equal to 0.8 and less than or equal to 1. This is probably because the quantitative ratio is in an optimum relationship between Li that is an ion conductive carrier, and Yb that forms the skeleton of the crystal lattices (that is, ion conductive pathways). In particular, the solid electrolyte materials have markedly high ion conductivity when the value of a is 1.

As is clear from EXAMPLES 11 and 19 to 22, the solid electrolyte materials have high ion conductivity when the value of z is greater than or equal to 0 and less than or equal to 1. This is probably because lithium ion diffusion pathways occur easily. The solid electrolyte materials tend to exhibit higher ion conductivity with decreasing value of z. This is probably because F present in the crystal lattices bonds strongly to Li to inhibit ion conduction.

The batteries of EXAMPLES 1 to 22 were charged and discharged at room temperature.

Hydrogen sulfide was not generated because the solid electrolyte materials of EXAMPLES 1 to 22 did not contain sulfur.

As described above, the solid electrolyte materials according to the present disclosure have high lithium ion conductivity near room temperature and are suitable for providing batteries that can be charged and discharged satisfactorily.

For example, the solid electrolyte materials of the present disclosure and the methods for production thereof are used in batteries (for example, all-solid-state lithium ion secondary batteries).

What is claimed is:

1. A solid electrolyte material consisting essentially of Li, Yb, and X, wherein X is at least two selected from the group consisting of F, Cl, Br, and I, and the solid electrolyte material is represented by the following compositional formula (1):

$$Li_{6-3a}Yb_aCl_{6-x-y-z}Br_xI_yF_z \quad (1)$$

wherein the formula satisfies the following five relations:

$0.5 \leq a \leq 1.5$, $0 < x < 6$, $0 < y \leq 3$, $0 \leq z \leq 2$, and $0 < x+y+z < 6$.

2. The solid electrolyte material according to claim 1, wherein the formula satisfies relation: $0.8 \leq a \leq 1.2$.

3. The solid electrolyte material according to claim 2, wherein the formula satisfies relation: $0.8 \leq a \leq 1.1$.

4. The solid electrolyte material according to claim 3, wherein the formula satisfies relation: $0.8 \leq a \leq 1$.

5. The solid electrolyte material according to claim 1, wherein the formula satisfies relation: $0 < x \leq 4$.

6. The solid electrolyte material according to claim 5, wherein the formula satisfies relation: $0 < x \leq 3$.

7. The solid electrolyte material according to claim 1, wherein the formula satisfies relation: $0 < y \leq 2$.

8. The solid electrolyte material according to claim 7, wherein the formula satisfies relation: $0 < y \leq 1.5$.

9. The solid electrolyte material according to claim 8, wherein the formula satisfies relation: $0 < y \leq 1$.

10. The solid electrolyte material according to claim 1, wherein the formula satisfies relation: $0 \leq z \leq 1$.

11. The solid electrolyte material according to claim 1, wherein

X-ray diffractometry of the solid electrolyte material using Cu-Kα radiation gives an X-ray diffraction pattern having:

at least two peaks in the range of diffraction angles 2θ of greater than or equal to 26.0° and less than or equal to 35.0°, and at least one peak in the range of diffraction angles 2θ of greater than or equal to 13.0° and less than or equal to 17.0°.

12. The solid electrolyte material according to claim 1, wherein the solid electrolyte material contains a crystal phase belonging to monoclinic crystals.

13. A battery comprising:

a positive electrode;

a negative electrode; and an electrolyte layer disposed between the positive electrode and the negative electrode, wherein at least one selected from the group consisting of the positive electrode, the negative electrode, and the electrolyte layer contains the solid electrolyte material described in claim 1.

* * * * *